United States Patent
Yamazaki et al.

(10) Patent No.: US 8,019,498 B2
(45) Date of Patent: Sep. 13, 2011

(54) SHIP-STEERING DEVICE

(75) Inventors: Takayoshi Yamazaki, Nishikamo-gun (JP); Atsuyuki Tsuzuki, Anjo (JP); Kouichi Iguchi, Komaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 900 days.

(21) Appl. No.: 11/995,058

(22) PCT Filed: Jul. 3, 2006

(86) PCT No.: PCT/JP2006/313629
§ 371 (c)(1),
(2), (4) Date: Jan. 8, 2008

(87) PCT Pub. No.: WO2007/010767
PCT Pub. Date: Jan. 25, 2007

(65) Prior Publication Data
US 2010/0121505 A1    May 13, 2010

(30) Foreign Application Priority Data
Jul. 20, 2005 (JP) ................. 2005-209676

(51) Int. Cl.
*B60L 15/00* (2006.01)
(52) U.S. Cl. ............... 701/21; 701/84; 701/47; 701/70; 701/78; 701/83; 303/140; 303/146; 903/916; 114/162
(58) Field of Classification Search ............ 701/21, 701/84, 41, 70, 78, 83, 90, 101, 224; 303/140, 303/146; 903/916; 114/144 RE, 162; 477/39, 477/44, 169
See application file for complete search history.

(56) References Cited

U.S. PATENT DOCUMENTS

| | | | | | |
|---|---|---|---|---|---|
| 1,385,795 | A | * | 7/1921 | Ries | 367/120 |
| 1,730,967 | A | * | 10/1929 | Carter | 33/324 |
| 3,838,660 | A | * | 10/1974 | Frisbee | 114/246 |
| 3,906,885 | A | * | 9/1975 | Woodfill | 440/42 |
| 4,223,624 | A | * | 9/1980 | Iyeta | 114/144 E |
| 4,242,979 | A | * | 1/1981 | Shima | 440/38 |
| 4,381,746 | A | * | 5/1983 | Miyagi et al. | 123/339.22 |
| 5,107,424 | A | * | 4/1992 | Bird et al. | 701/21 |
| 5,167,934 | A | * | 12/1992 | Wolf et al. | 422/177 |

(Continued)

FOREIGN PATENT DOCUMENTS

JP    59 175629    10/1984

(Continued)

*Primary Examiner* — James P Trammell
*Assistant Examiner* — McDieunel Marc
(74) *Attorney, Agent, or Firm* — Oblon, Spivak, McClelland, Maier & Neustadt, L.L.P.

(57) ABSTRACT

An instruction value conversion section (31) of an operation target calculation section (30) converts an instruction signal from a joystick (25). In order to obtain a movement mode of a ship intended by an operator, a target propeller speed calculation section (32) calculates, using each converted value, target rotation speed of right and left propellers (13) and the propeller (14b) of a thruster (14). At a main engine operation control section (40), a slip rate determination section (41) calculates the slip rate U of a clutch mechanism (120) of a marine gear (12) in order to rotate the propellers (13) at the target rotation speed. A drive control section (42) controls operation of the main engine (11) and the clutch mechanism (120). Further, in a thruster operation control section (50), a drive control section (52) controls drive of the propeller (14b) in the rotational direction determined by an operation determining section (51).

7 Claims, 10 Drawing Sheets

U.S. PATENT DOCUMENTS

| | | | |
|---|---|---|---|
| 5,313,397 A * | 5/1994 | Singh et al. | 701/224 |
| 5,336,120 A * | 8/1994 | Maurer et al. | 440/84 |
| 5,754,429 A * | 5/1998 | Ishihara et al. | 701/200 |
| 5,916,284 A * | 6/1999 | Ishihara et al. | 701/21 |
| 6,678,589 B2 * | 1/2004 | Robertson et al. | 701/21 |
| 6,868,317 B2 * | 3/2005 | Okuyama | 701/21 |
| 7,156,034 B2 * | 1/2007 | Mizutani | 114/162 |
| 2003/0109359 A1 * | 6/2003 | Eguchi et al. | 477/174 |
| 2005/0199167 A1 * | 9/2005 | Mizutani | 114/144 R |

FOREIGN PATENT DOCUMENTS

| | | |
|---|---|---|
| JP | 7 196090 | 8/1995 |
| JP | 7 196091 | 8/1995 |
| JP | 3057413 | 4/2000 |
| JP | 2002 234495 | 8/2002 |
| JP | 2003 2296 | 1/2003 |

* cited by examiner

SHIP-STEERING DEVICE

TECHNICAL FIELD

The present invention relates to a ship-steering device for moving, swinging, and turning a ship.

BACKGROUND ART

Conventionally, as disclosed in, for example, Japanese Patent No. 3057413, an automatic ship-steering device has been known. The disclosed automatic ship-steering device is configured such that a remote operation box is connected to a control and arithmetic device. The remote operation box has a joystick lever for setting the direction of movement of a hull in accordance with the direction of tilt of the lever and for setting the speed of movement of the hull in accordance with the angle of tilt of the lever, and a swing dial for setting the direction of swinging of the hull in accordance with the direction of turning of the dial and for setting an angular speed of swinging in accordance with the quantity of turning of the dial. During dead slow run, which is achieved by rotating propellers at dead slow speed by means of a speed reducer, a ship operator can turn the hull, cause the hull to undergo pinwheeling, or move the hull translationally by operating only the joystick lever and the swing dial.

The above-mentioned automatic ship-steering device allows a ship operator to turn the hull, to cause the hull to undergo pinwheeling, or to move the hull translationally at dead slow speed by operating only the joystick lever and the swing dial, without need to operate other equipment. Thus, for example, when the automatic ship-steering device is applied to a large ship, since, usually, a seaman who is familiar with behavioral variations of the ship steers the ship, use of the automatic ship-steering device improves operability and allows the seaman to readily move the hull. However, the joystick lever and the swing dial must be operated individually. Therefore, when the automatic ship-steering device is applied to a small ship, there arises a case where a user who is unfamiliar with the behavioral variations of the ship steers the ship. In such a case, the user may fail to readily move the hull by operating the joystick lever and the swing dial. In some cases, a small ship is not equipped with a speed reducer. Such a small ship encounters difficulty in maintaining dead slow run. This may make steering more difficult.

As for a device for maintaining dead slow run, there has been known a slip ratio adjuster for a marine gear as disclosed in Japanese Patent Application Laid-Open (kokai) No. H7-196090. The slip ratio adjuster has a controller for controlling a solenoid which hydraulically controls a clutch of the marine gear, via a PID control circuit and a PWM control circuit. The controller has a variable resistor. A control-range-adjusting trimmer is connected in series with the variable resistor. Thus, even when a ship operator sets the maximum rotational speed of a screw (propeller) to an arbitrary value, a voltage corresponding to the rotational speed of the screw (propeller) can be divided through adjustment of the control-range-adjusting trimmer. By controlling the solenoid with the divided voltage, the full range of the controller can be modified so as to correspond to the set maximum rotational speed. Therefore, fine adjustment of rotation of the screw (propeller) can be carried out with ease.

However, according to the conventional adjuster for adjusting the slip ratio of the marine gear as mentioned above, the slip ratio is adjusted merely proportionally in association with modification of the full range of the controller, thereby adjusting the rotational speed of the screw (propeller). That is, the slip ratio is not adjusted in consideration of ship behaviors. Therefore, for example, even when a ship operator is to run a ship at dead slow speed by operating the controller, the screw (propeller) may fail to actually rotate due to influence of disturbances, such as a resistance force against rotation of the screw (propeller), waves, and wind. Thus, the speed of movement of the ship varies nonlinearly in relation to a control input to the controller, and dead slow run intended by the ship operator may fail to be maintained. Therefore, the ship operator must control the controller at all times, so that ship-steering operations become complicated.

DISCLOSURE OF THE INVENTION

The present invention has been achieved for solving the above problems, and an object of the invention is to provide a ship-steering device which appropriately controls the slip ratio of a marine gear and facilitates dead slow movement of a ship.

To achieve the above object, the present invention provides a ship-steering device which controls an operation of a clutch mechanism of a marine gear adapted to transmit rotation of a main engine to a propeller, so as to vary a rotational speed of the propeller in relation to a rotational speed of the main engine, comprising ship-steering means which a ship operator operates for steering a ship; operational-input-value detection means for detecting an operational input value which the ship operator inputs to the ship-steering means; target propeller rotational-speed computation means for computing a target rotational speed of the propeller in relation to the rotational speed of the main engine on the basis of the detected operational input value; target slip-ratio determination means for determining a target slip ratio of the clutch mechanism of the marine gear within a predetermined range in order to rotate the propeller at the computed target rotational speed; and operation control means for controlling a quantity of operation of the clutch mechanism of the marine gear with the determined target slip ratio.

According to the present invention, on the basis of an operational input value which the ship operator inputs by operating the ship-steering means, a target rotational speed for moving the ship at dead slow speed can be computed. Also, a target slip ratio for rotating the propeller at the computed target rotational speed can be determined. Determination of the target slip ratio enables control of the quantity of operation of the clutch mechanism. Thus, even when the ship operator is unfamiliar with the behavioral variations of the ship, the ship operator can move the ship at dead slow speed in an intended mode, such as translational movement or in situ swinging, merely by operating the ship-steering means. Therefore, steering of the ship becomes very simple. Furthermore, the target slip ratio can be determined within a predetermined range. Thus, for example, the predetermined range can be set in consideration of durability of the clutch mechanism, whereby the service life of the clutch mechanism can be lengthened.

When the computed target rotational speed is less than at least an idle rotational speed, which is a rotational speed of the main engine under no load, the target slip-ratio determination means may determine the target slip ratio by uniformly varying the target slip ratio according to a magnitude of the target rotational speed. This allows the propeller to rotate uniformly; e.g., linearly at less than the idle rotational speed of the main engine. Therefore, for example, even when the ship operator intends to move the ship at dead slow speed, the ship operator can move the ship in the intended mode and can move the ship very easily.

The target slip-ratio determination means may determine the target slip ratio on the basis of a relation that the target slip ratio varies stepwise according to variation of the rotational speed of the main engine. In this case, the relation that the target slip ratio varies stepwise may be such that: when the rotational speed of the main engine is less than an idle rotational speed under no load, the target slip ratio varies uniformly with a first inclination; when the rotational speed of the main engine is equal to or greater than the idle rotational speed and less than a predetermined rotational speed, the target slip ratio varies uniformly with a second inclination smaller than the first inclination; and when the rotational speed of the main engine is equal to or greater than the predetermined rotational speed, the target slip ratio becomes constant.

Through employment of the above-mentioned relation, in the case where the rotational speed of the main engine; in other words, the working speed range of the main engine, varies, the target slip ratio can be determined by varying the target slip ratio stepwise according to variation of the rotational speed (working speed range). For example, when the main engine is operating at less than the idle rotational speed, the target slip ratio can be determined on the basis of the large first inclination. By virtue of this, even when the target rotational speed is low, the propeller can be reliably rotated against resistance force by greatly varying (e.g., reducing) the actual slip ratio of the clutch mechanism. Therefore, even under the idle rotational speed of the main engine, the rotational speed of the propeller can be uniformly varied.

When the main engine is rotating at a rotational speed equal to the idle rotational speed or greater and less than the predetermined rotational speed, the rotational speed of the main engine increases (or decreases) uniformly. By contrast, by means of determining the target slip ratio on the basis of the second inclination smaller than the first inclination, an excessive variation of the actual slip ratio of the clutch mechanism can be prevented. This can prevent rotation of the propeller at a rotational speed greater than a target rotational speed, thereby preventing abrupt movement of the ship. Since the actual slip ratio can be varied gently on the basis of the target slip ratio, generation of impact associated with operation of the clutch mechanism can be prevented. Furthermore, when the main engine is operating at the predetermined rotational speed or greater, the target slip ratio can be maintained at a constant value. Thus, the rotational speed of the propeller can be varied linearly according to the uniformly increasing (decreasing) rotational speed of the main engine.

As mentioned above, even when the rotational speed of the main engine varies, the rotational speed of the propeller can be varied linearly at all times in accordance with the ship operator's operation of the ship-steering means. Thus, when the ship is to be moved at dead slow speed, the behavioral characteristic of the ship can be linearly varied. By virtue of this, even a ship operator who is unfamiliar with the behavioral variations of the ship can steer the ship very easily with simple operations.

Furthermore, the ship-steering device may further comprise actual-rotational-speed detection means for detecting an actual rotational speed of the propeller, and the operation control means may correct the quantity of operation of the clutch mechanism on the basis of a difference between the detected actual rotational speed and the target rotational speed while taking into consideration variation of the actual rotational speed of the propeller caused by disturbance acting on the ship. By virtue of this, even when the actual rotational speed of the propeller is influenced by disturbances, such as waves, sea currents, and wind, acting on the ship, the propeller can be reliably rotated at the target rotational speed. Therefore, the ship can be moved at dead slow speed as intended by the ship operator.

The ship-steering means may comprise a joystick lever which inputs a direction of movement and a speed of movement of the ship when tilted by the ship operator, and a dial which is unitarily attached to the joystick lever and which inputs a direction of swinging and a speed of swinging of the ship when turned. The ship-steering means may be operated by the ship operator, for example, when the ship is to come alongside or leave a pier. By virtue of this, the ship operator can move the ship at dead slow speed by operating the ship-steering means in which the joystick lever and the dial are united together. Therefore, the ship operator can steer the ship one-handed and thus can move the ship at dead slow speed with great ease.

Furthermore, the ship-steering device may further comprise thruster control means for controlling operation of a thruster adapted to swing, in a predetermined turning direction, the ship in a dead slow run state in which the rotational speed of the propeller is reduced in relation to the rotational speed of the main engine. By virtue of this, during dead slow run, a bow can be reliably swung in response to ship operator's operation of the ship-steering means. Thus, the ship can move at dead slow speed as intended by the ship operator.

BEST MODE FOR CARRYING OUT THE INVENTION

Figure 1:
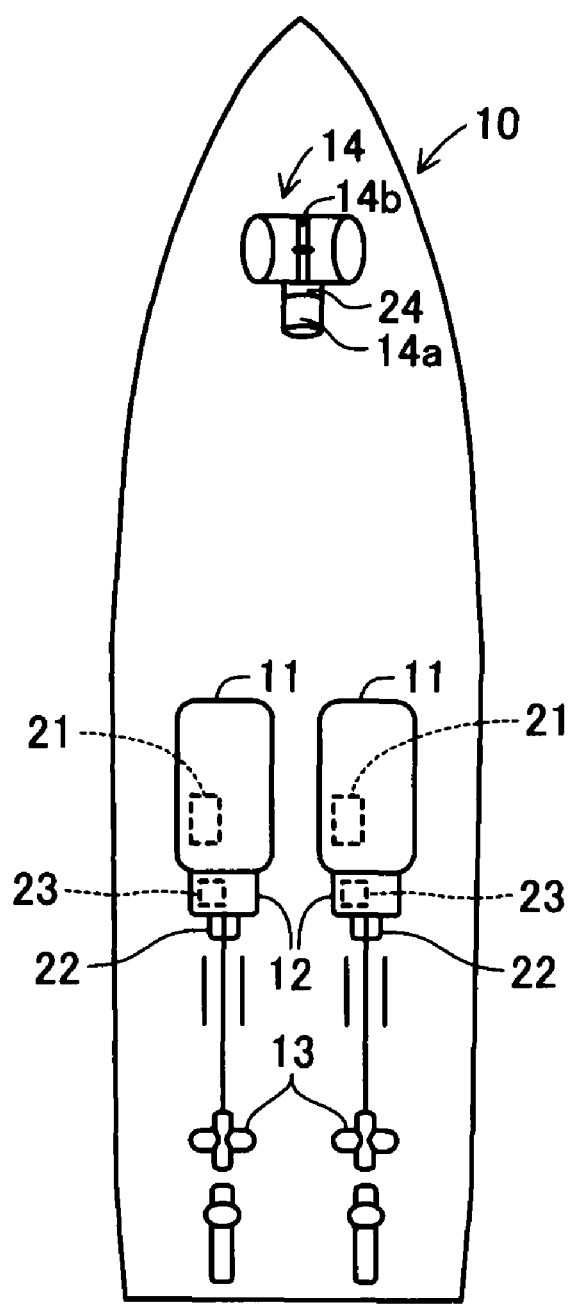
FIG. 1 is a view schematically showing the configuration of a hull to which a ship-steering device according to an embodiment of the present invention is applied.

A ship-steering device according to an embodiment of the present invention will next be described in detail with reference to the drawings. FIG. 1 schematically shows the configuration of a ship to which the ship-steering device according to the embodiment of the present invention is applied.

The ship has two main engines 11 mounted on a hull 10, and propellers 13 are respectively attached to the main engines 11 via respective marine gears 12. The main engines 11 are arranged laterally at the stern side of the hull 10. Each of the main engines 11 generates a rotational drive force corresponding to a working rotational speed and outputs the rotational drive force to the corresponding marine gear 12. Each of the marine gears 12 includes a plurality of gears for transmission of the rotational drive force transmitted from the corresponding main engine 11 and has a clutch mechanism 120 for changing the rotational direction of the transmitted rotational drive force from the forward direction to the reverse direction and vice versa by changing over the manners of meshing of the gears. For example, a widely known wet multi-plate clutch mechanism is employed as the clutch mechanism 120. The clutch mechanism 120 will be described briefly.

Figure 2:
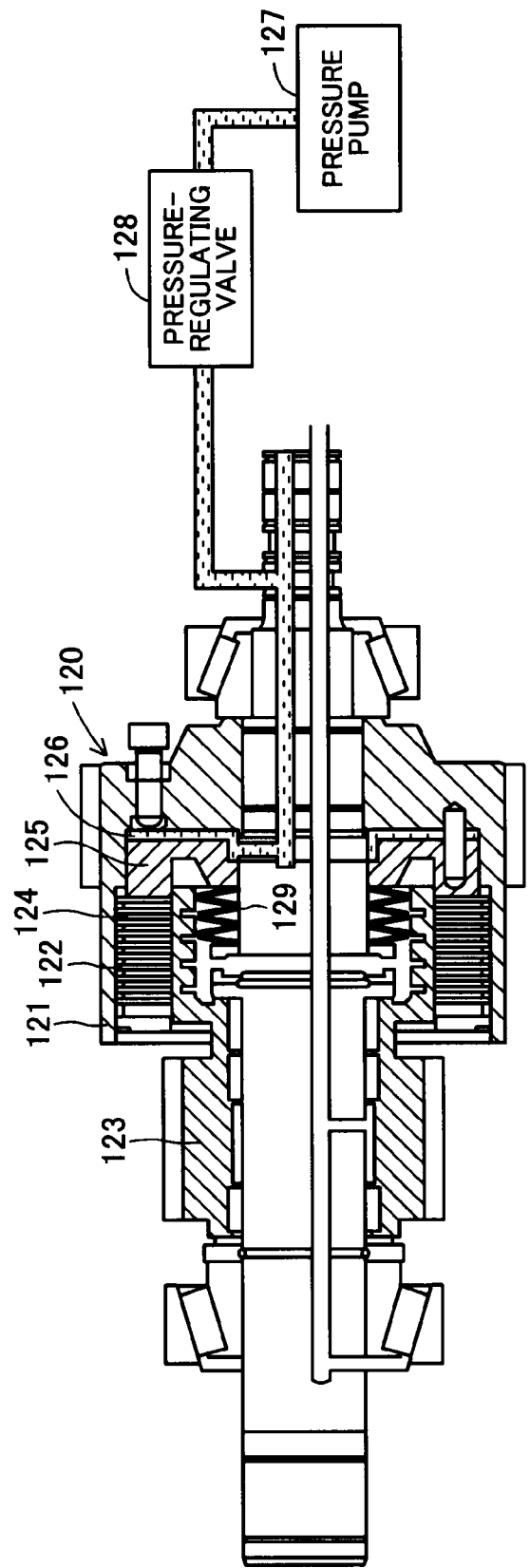
FIG. 2 is a sectional view for explaining a clutch mechanism provided in a marine gear of FIG. 1.

As partially and schematically shown in FIG. 2, the clutch mechanism 120 to be employed in each of the marine gears 12 has friction plates 122 which rotate unitarily with a clutch case 121, and separator plates 124 which are disposed within the clutch case 121 and which rotate unitarily with a hub 123, which in turn rotates in relation to the clutch case 121. The friction plates 122 and the separator plates 124 are axially displaceable in relation to the clutch case 121 or the hub 123.

Furthermore, a piston 125 is disposed within the clutch case 121. An oil chamber 126 is formed between the piston 125 and the inner surface of the clutch case 121. A working fluid is pressurized by a pressure pump 127 and is then pressure-regulated by a pressure-regulating valve 128 whose opening is electrically controlled so as to regulate hydraulic pressure. The pressure-regulated working fluid is supplied to the oil chamber 126. A return spring 129 urges the piston 125 in such a direction as to disengage the friction plates 122 and the separator plates 124 from one another.

In the thus-constituted clutch mechanism 120, when the working fluid is supplied into the oil chamber 126, the piston 125 moves leftward in FIG. 2 against the force of the return spring 129 and applies a pressing force to the friction plates 122 and the separator plates 124 for their engagement. This generates a predetermined friction force between the friction plates 122 and the separator plates 124, thereby effecting transmission of a rotational drive force.

Meanwhile, when the working fluid is drained from the oil chamber 126, the force of the return spring 129 causes the piston 125 to move rightward in FIG. 2, thereby disengaging the friction plates 122 and the separator plates 124 from one another. As a result, a friction force between the friction plates 122 and the separator plates 124 drops, thereby shutting off transmission of the rotational drive force.

Each of the propellers 13 can be rotated in the forward direction or in the reverse direction by operating the clutch mechanism 120 as mentioned above so as to change over the manners of transmission of rotational drive force to the plurality of gears which constitute each of the marine gears 12. When the rotational direction of each of the propellers 13 is not changed over, by means of varying the friction force between the friction plates 122 and the separator plates 124 of the clutch mechanism 120; in other words, controlling the hydraulic pressure of the working fluid supplied to the oil chamber 126, a relative rotational-speed differential; i.e., a slip ratio, between the friction plates 122 and the separator plates 124 can be varied. By virtue of this, the rotational speed of each of the propellers 13 can be varied (more specifically, the rotational speed of each of the propellers 13 can be decrementally varied) as appropriate in relation to the working rotational speed of the corresponding main engine 11.

As shown in FIG. 1, a thruster 14 is provided at the bow side of the hull 10. The thruster 14 generates a predetermined thrust force in the leftward or rightward direction of the hull 10 and includes an electric motor 14a and a propeller 14b for generating a thrust force in the leftward or rightward direction. The thruster 14 is operated mainly in movement at dead slow speed so as to turn the hull 10 by a generated leftward or rightward thrust force.

Figure 3:
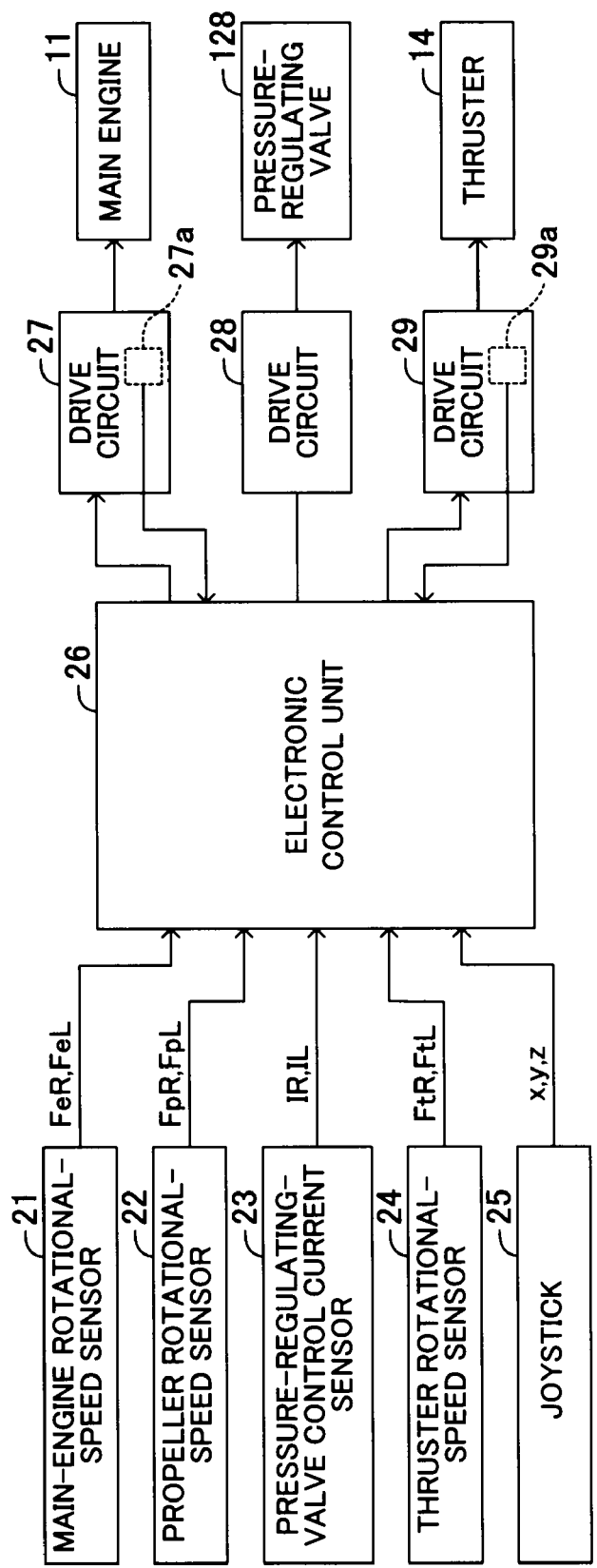
FIG. 3 is a schematic block diagram showing the configuration of an electric control system according to the embodiment of the present invention.

Next, an electric control system for controlling operations of the main engines 11, the marine gears 12 (more specifically, the clutch mechanisms 120), and the thruster 14, which respectively have the structures described above, will be described in detail with reference to FIG. 3.

The electric control system has main-engine rotational-speed sensors 21, propeller rotational-speed sensors 22, pressure-regulating-valve control current sensors 23, and a thruster rotational-speed sensor 24. The main-engine rotational-speed sensors 21 are provided on the left and right main engines 11, respectively, and detect and output working rotational speeds FeR and FeL of the main engines 11. The propeller rotational-speed sensors 22 are provided on output shafts of the marine gears 12, respectively, and detect and output rotational speeds FpR and FpL of the left and right propellers 13. The pressure-regulating-valve control current sensors 23 detect and output control currents IR and IL which flow to the right and left pressure-regulating valves 128, respectively. The thruster rotational-speed sensor 24 detects and outputs rotational speeds FtR and FtL of the propeller 14b of the thruster 14 associated with rightward and leftward thrusts, respectively.

Figure 4:
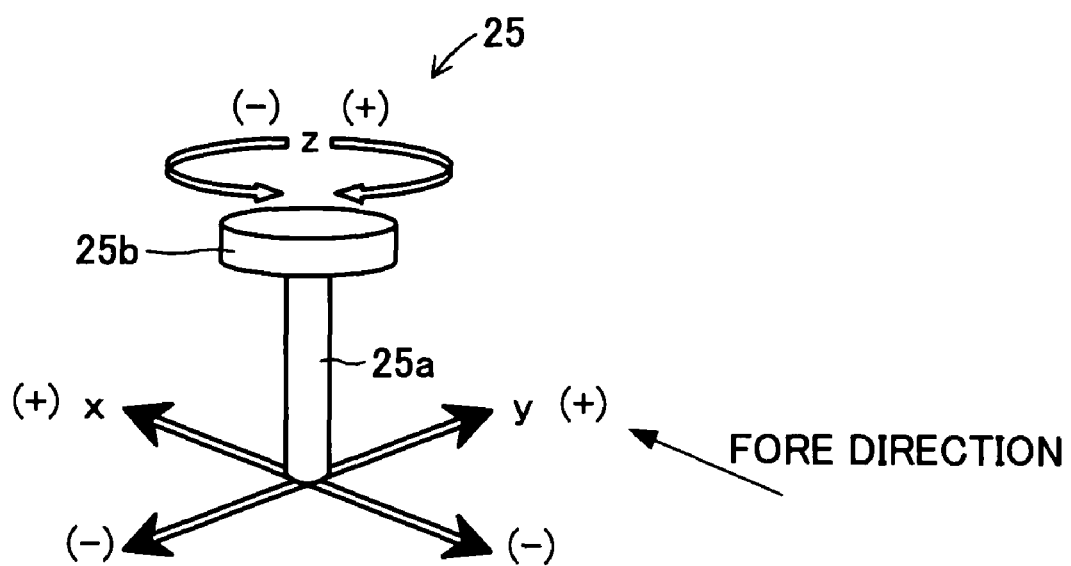
FIG. 4 is a view for explaining the structure of a joystick of FIG. 3.

The electric control system also has a joystick 25 which a ship operator operates when a ship is to be moved at dead slow speed; for example, when the ship is to come alongside or leave a pier, in order to input the direction of movement and the speed of movement of the ship. As schematically shown in FIG. 4, the joystick 25 includes a joystick lever 25a which the ship operator tilts, and a dial 25b which the ship operator turns.

When the ship operator tilts the joystick lever 25a in the frontward or rearward direction of the ship, the joystick 25 outputs an instruction signal x for moving the ship forward or rearward according to the quantity of tilting operation (e.g., the angle of tilting or the quantity of tilting). When the ship operator tilts the joystick lever 25a in the leftward or rightward direction of the ship, the joystick 25 outputs an instruction signal y for moving the ship leftward or rightward according to the quantity of tilting operation. Furthermore, when the ship operator turns the dial 25b, the joystick 25 outputs an instruction signal z for swinging the ship according to the quantity of turning operation (e.g., the angle of turning or the quantity of turning).

Dead bands are set for the operations of the joystick lever 25a and the dial 25b, respectively. The dead bands are determined on the basis of the operating positions of the joystick lever 25a and the dial 25b at which the propellers 13 and the propeller 14b can be reliably rotated against, for example, a friction force between an output shaft and a sliding bearing.

The instruction signal x is output as a positive value when the joystick lever 25a is tilted frontward. The instruction signal y is output as a positive value when the joystick lever 25a is tilted rightward. The instruction signal z is output as a positive value when the dial 25b is turned clockwise.

The sensors 21 to 24 and the joystick 25 are connected to the input side of an electronic control unit 26. The electronic control unit 26 has, as a main component, a microcomputer which is composed of a CPU, a ROM, a RAM, etc. The electronic control unit 26 executes programs by use of detected values from the sensors 21 to 24 and instruction signals from the joystick 25, thereby controlling operations of the main engines 11, the clutch mechanisms 120 (more specifically, the pressure-regulating valves 128) of the marine gears 12, and the thruster 14.

Drive circuits 27, 28, and 29 are connected to the output side of the electronic control unit 26. The drive circuits 27 drive and control corresponding actuators which operate throttle bodies of the two main engines 11, respectively. Each of the drive circuits 27 has a current detector 27a for detecting drive current flowing through the corresponding actuator. Drive currents detected by the current detectors 27a are fed back to the electronic control unit 26. The drive circuits 28 drive and control the corresponding pressure-regulating valves 128. The drive circuit 29 is, for example, an inverter circuit and controls power supply from an unillustrated battery, thereby driving and controlling the electric motor 14a of the thruster 14. The drive circuit 29 also has a current detector 29a for detecting drive current flowing through the electric motor 14a, and a detected drive current is fed back to the electronic control unit 26.

Figure 5:
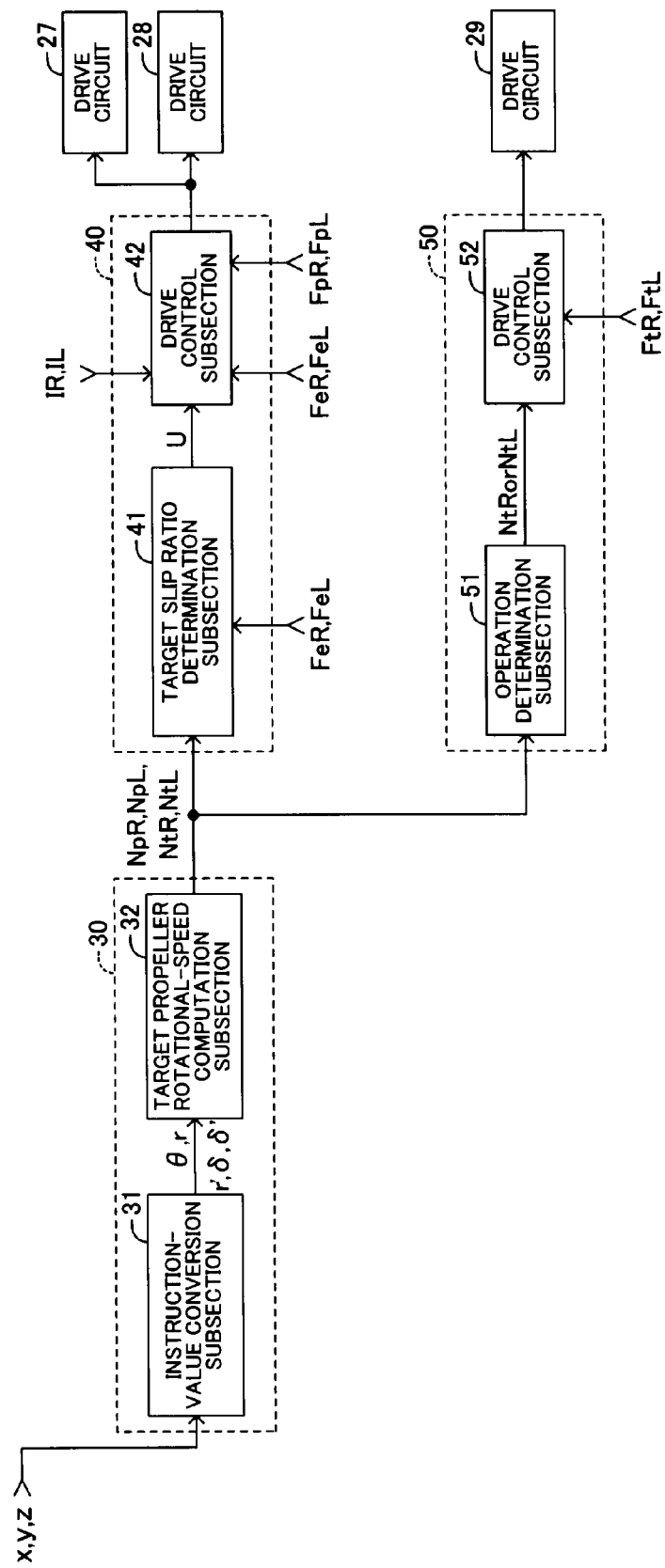
FIG. 5 is a functional block diagram functionally showing execution of computer programs in an electronic control unit of FIG. 3.

Next, the operation of the thus-configured embodiment will be described with reference to the functional block diagram of FIG. 5 showing functions which are yielded through execution of computer programs in the electronic control unit 26. The electronic control unit 26 includes an operational-target-value computation section 30 for computing target rotational speeds of the propellers 13 connected to the main engines 11 and an operational control speed of the propeller 14b of the thruster 14; a main-engine operation control section 40 for controlling operations of the main engines 11 and the clutch mechanisms 120 so that the propellers 13 rotate at respective computed target rotational speeds; and a thruster operation control section 50 for controlling operation of the thruster 14 so that the propeller 14b rotates at a computed target rotational speed.

When the ship operator operates the joystick 25, the joystick 25 outputs the instruction signal x and the instruction signal y based on the operation of tilting the joystick lever 25a and outputs the instruction signal z based on the operation of turning the dial 25b. The output instruction signals x, y, and z are supplied to an instruction-value conversion subsection 31 of the operational-target-value computation section 30 of the electronic control unit 26. By use of the instruction signals x and y, the instruction-value conversion subsection 31 computes a direction θ of movement and a distance r of movement (a speed r' of movement) of the ship as intended by the ship operator. Also, by use of the instruction signal z, the instruction-value conversion subsection 31 computes an angle δ of swinging and an angular speed δ' of swinging of the ship as intended by the ship operator. The direction θ of movement, the distance r of movement (the speed r' of movement), the angle δ of swinging, and the angular speed δ' of swinging (which are hereinafter called the instruction values) are supplied to a target propeller rotational-speed computation subsection 32 which computes target rotational speeds for the propellers 13 connected to the respective main engines 11 and the propeller 14b of the thruster 14.

On the basis of the supplied instruction values, the target propeller rotational-speed computation subsection 32 computes target rotational speeds NpR and NpL for the right and left propellers 13, respectively, and a target rotational speed NtR associated with rightward thrust or a target rotational speed NtL associated with leftward thrust for the propeller 14b. The computation of the target rotational speeds NpR, NpL, NtR, and NtL will next be described in detail.

First will be described modes of movement of the ship when the ship operator operates the joystick 25. In the present embodiment, the hull 10 is equipped with two main engines 11 which generate respective thrust forces in the front-rear direction of the hull 10, and the thruster 14 which generates a thrust force in the left-right direction of the hull 10. When the ship operator operates the joystick 25, the actual rotational speeds FpR and FpL of the propellers 13 and the actual rotational speed FtR or FtL of the propeller 14b are adjusted so as to move the ship translationally or to swing the ship in situ (hereinafter, this swinging is called pinwheeling). When the ship is to be moved translationally, as will be described later, the main engines 11, the marine gears 12, and the thruster 14 are controlled in such a manner that the actual rotational speeds FpR and FpL of the propellers 13 coincide with the target rotational speeds NpR and NpL, respectively and that the rotational speed FtR or FtL of the propeller 14b coincides with the target rotational speed NtR or NtL. When the ship is to undergo pinwheeling, the two main engines 11 and the two marine gears 12 are controlled in such a manner that the actual rotational speeds FpR and FpL of the propellers 13 become the target rotational speeds NpR and NpL, respectively.

When the ship is caused to undergo translational movement or pinwheeling only by operationally controlling propulsion systems composed of the main engines 11, the marine gears 12, the propellers 13, and the thruster 14 (more specifically, the electric motor 14a and the propeller 14b), the following equations of motion hold. Specifically, when the ship undergoes translational movement, the following equation of motion expressed by Eq. 1 holds.

$$T+Fwc=m \cdot r''+Cs \cdot r' \qquad \text{Eq. 1}$$

In Eq. 1, T is a summation of thrust vectors of thrust forces generated by the propulsion systems mounted on the ship and is expressed by the following Eq. 2. In Eq. 2, n is the number of propulsion mechanisms corresponding to the propulsion systems.

$$T=\Sigma Ti \; i=1,2,\ldots,n(n \geq 3) \qquad \text{Eq. 2}$$

In Eq. 1, Fwc is a value indicative of influence of disturbances, such as wind and sea currents; m is the weight of the ship; and Cs is the coefficient of attenuation. Also, r is the distance of translational movement; r' is the speed of movement; and r'' is the acceleration of movement.

In translational movement, in addition to Eq. 1, the following Eq. 3 holds with respect to moments of thrust forces generated by the propulsion systems.

$$M+Mwc=0 \qquad \text{Eq. 3}$$

In Eq. 3, M is a summation of thrust moments of thrust forces generated by the propulsion mechanisms mounted on the ship and is expressed by the following Eq. 4.

$$M=\Sigma Mi \; i=1,2,\ldots,n(n \geq 3) \qquad \text{Eq. 4}$$

In Eq. 3, Mwc is a moment which is generated in association with Fwc mentioned previously.

Next will be discussed how a thrust vector Ti and a thrust moment Mi which the propulsion systems generate interrelationally act on the ship which undergoes translational movement. The thrust vector Ti and the thrust moment Mi are expressed as functions of the direction θ of movement and the distance r of movement; i.e., as Ti=r·fi(θ) and Mi=Ti·Li·Si, respectively, where Li is the length of a perpendicular between the center of gravity of the ship and a thrust vector, and Si is a sign indicative of the acting direction of a moment. For easy understanding, consider a summation of thrust vectors when r=1 (0≦r≦1) and θ=0 (e.g., when the ship is run forward). Then, the following Eq. 5 holds from Eq. 2 mentioned above.

$$T=\Sigma(fi(0)\cdot\cos\alpha i)i=1,2,\ldots,n(n\geq 3) \qquad \text{Eq. 5}$$

In Eq. 5, αi is the angle between thrust vectors of the propulsion systems and the front-rear direction of the ship. In the case where the ship moves in an arbitrary direction θ of movement, a summation of cos components of thrust vectors which is computed by Eq. 5 becomes equal to a summation of cos components of thrust vectors of thrust forces generated by the propulsion systems. Therefore, on the basis of the aforementioned Eq. 5, the following Eq. 6 holds.

$$T=\Sigma(fi(0)\cdot\cos\alpha i)\cdot\cos\theta=\Sigma(fi(\theta)\cdot\cos\alpha i)i= 1,2,\ldots,n(n\geq 3) \qquad \text{Eq. 6}$$

As in the case of the above Eq. 6, when θ=π/2 (e.g., when the ship is run rightward), a summation of thrust vectors can be expressed by the following Eq. 7.

$$T=\Sigma(fi(\pi/2)\cdot\sin\alpha i)\cdot\sin\theta=\Sigma(fi(\theta)\cdot\sin\alpha i)i= 1,2,\ldots,n(n\geq 3) \qquad \text{Eq. 7}$$

Because of translational movement, a summation of thrust moments becomes "0." Thus, on the basis of Eq. 4, the following Eq. 8 holds.

$$M=\Sigma(fi(\theta)\cdot Li\cdot Si)=0 i=1,2,\ldots,n(n\geq 3) \qquad \text{Eq. 8}$$

Therefore, a thrust force fi(θ) which the propulsion systems must generate for translational movement can be computed according to Eqs. 6, 7, and 8.

Meanwhile, when the ship undergoes pinwheeling, the following equation of movement expressed by Eq. 9 holds.

$$M+Mwc=I\cdot\delta''+Ct\cdot\delta' \qquad \text{Eq. 9}$$

In Eq. 9, M is a summation of thrust moments which is computed according to the aforementioned Eq. 4. In Eq. 9, I is the moment of inertia of the hull. Also, δ is the angle of swinging; δ' is the angular speed of swinging; and δ" is the angular acceleration of swinging. In pinwheeling, the following Eq. 10 holds with respect to a summation of thrust vectors of thrust forces generated by the propulsion systems.

$$T+Fwc=0 \qquad \text{Eq. 10}$$

In Eq. 10, T is a summation of thrust vectors which is computed according to the aforementioned Eq. 2.

Next will be discussed how a thrust vector Ti and a thrust moment Mi generated by the propulsion systems interrelationally act on the ship which undergoes pinwheeling. The thrust vector Ti and the thrust moment Mi are expressed as functions of δ; i.e., as Ti=gi(δ) and Mi=Ti·Li·Si, respectively, where Li is the length of a perpendicular between the center of gravity of the ship and a thrust vector, and Si is a sign indicative of the acting direction of a moment. When the ship undergoes pinwheeling, a summation of thrust vectors becomes "0." Therefore, the following Eqs. 11 and 12 hold.

$$T=\Sigma(gi(\delta)\cdot\cos\alpha i)=0 i=1,2,\ldots,n(n\geq 3) \qquad \text{Eq. 11}$$

$$T=\Sigma(gi(\delta)\cdot\sin\alpha i)=0 i=1,2,\ldots,n(n\geq 3) \qquad \text{Eq. 12}$$

Thus, a thrust force gi(δ) which the propulsion systems generate for pinwheeling can be computed according to Eqs. 11 and 12.

Furthermore, when a translational movement and pinwheeling are combined together, the propulsion systems generate a total thrust force of adding up a thrust force r·fi(θ) associated with translational movement and a thrust force gi(δ) associated with pinwheeling; i.e., a thrust force of r·fi(θ)+gi(δ).

In the case where a thrust force is generated by rotating a propeller, there exists a region in which a thrust force and a resistance force balance with each other after sufficient elapse of time from start of rotation of the propeller; i.e., a steady-state region. In the steady-state region, on the basis of Eqs. 1 and 3 and Eqs. 9 and 10, the following Eqs. 13 and 14 hold at the time of translational movement, and the following Eqs. 15 and 16 hold at the time of pinwheeling.

$$T=Cs\cdot r' \qquad \text{Eq. 13}$$

$$M=0 \qquad \text{Eq. 14}$$

$$M=Ct\cdot\delta' \qquad \text{Eq. 15}$$

$$T=0 \qquad \text{Eq. 16}$$

In the case where rotation of a propeller generates a thrust force S, the following Eq. 17 is known to hold with respect to the thrust force S and a rotational speed e of the propeller.

$$S=\rho\cdot e^2\cdot D^4\cdot Ks \qquad \text{Eq. 17}$$

In Eq. 17, ρ is fluid density; D is the diameter of the propeller; and Ks is the coefficient of thrust.

Figure 6:
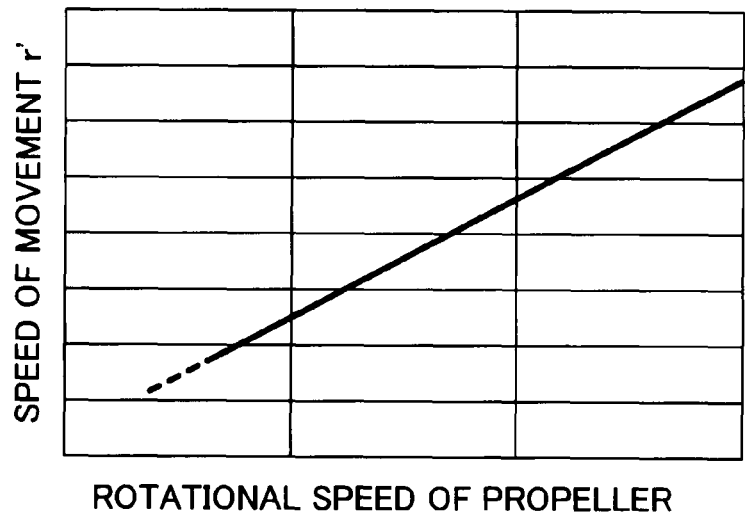
FIG. 6 is a graph showing the relation between the rotational speed of a propeller and the speed of movement.
Figure 7:
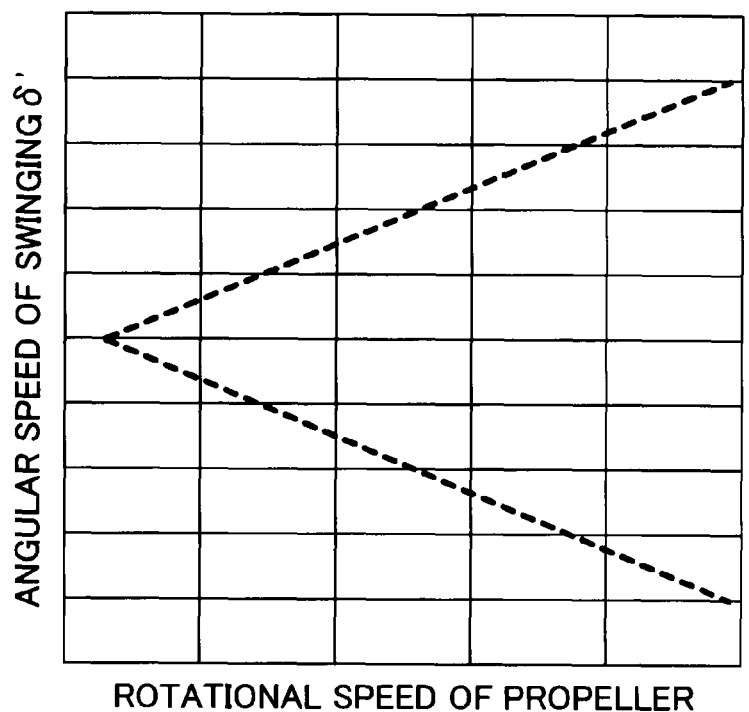
FIG. 7 is a graph showing the relation between the rotational speed of the propeller and the angular speed of swinging.

In the case of a turbulent flow, a resistance force is known to be substantially proportional to the square of speed. Therefore, the speed r' of movement and the angular speed δ' of swinging are presumed to be in proportional relation with the rotational speed e of the propeller. The present inventors, et al. experimentally verified the relation of the speed r' of movement to the rotational speed e of the propeller and the relation of the angular speed δ' of swinging to the rotational speed e of the propeller. The experimental results are shown in FIGS. 6 and 7. As is understandable from FIGS. 6 and 7, when the ship is to undergo translational movement at the speed r' of movement which varies linearly, or when the ship is to undergo pinwheeling at the angular speed δ' of swinging which varies linearly, the rotational speed e of the propeller may be controlled linearly.

On the basis of the above, computation of the target rotational speeds NpR and NpL of the propellers 13 and the target rotational speed NtR or NtL of the propeller 14b will be described for the case where the ship of the present embodiment is to undergo translational movement or pinwheeling. First, the case where the ship is translationally moved will be described.

As mentioned above, the ship according to the present embodiment is equipped with two main engines 11 and the thruster 14 which serve as propulsion systems; therefore, the number n of propulsion systems in the aforementioned Eqs. 6 to 8 is "3." The angle between thrust vectors of the main engines 11 and the front-rear direction of the hull 10 is "0," and the angle between a thrust vector of the thruster 14 and the front-rear direction of the hull 10 is "π/2." In the aforementioned Eqs. 6 to 8, a propulsion mechanism corresponding to n=1 is taken as, for example, the right-hand main engine 11 in FIG. 1; a propulsion mechanism corresponding to n=2 is taken as, for example, the left-hand main engine 11 in FIG. 1; and a propulsion mechanism corresponding to n=3 is taken as the thruster 14. The sign Si indicative of the acting direction of a moment in the aforementioned Eq. 8 is specified as follows: S1=−1, S2=1; and S3=1. Then, the following Eqs. 18 to 20 hold.

$$(fR(0)+fL(0))\cdot \cos\theta = fR(\theta)+fL(\theta) \quad \text{Eq. 18}$$

$$ft(\pi/2)\cdot \sin\theta = ft(\theta) \quad \text{Eq. 19}$$

$$-fR(\theta)\cdot LR + fL(\theta)\cdot LL + ft(\theta)\cdot Lt = 0 \quad \text{Eq. 20}$$

In Eqs. 18 to 20, fR(0) or fR(θ) is a thrust force of the right-hand main engine 11; fL(0) or fL(θ) is a thrust force of the left-hand main engine 11; and ft(π/2) or ft(θ) is a thrust force of the thruster 14. In Eq. 20, "LR" is the distance between a thrust vector of the right-hand main engine 11 and the center of gravity; "LL" is the distance between a thrust vector of the left-hand main engine 11 and the center of gravity; and "Lt" is the distance between a thrust vector of the thruster 14 and the center of gravity.

On the basis of the aforementioned Eqs. 18 to 20, thrust forces of the propulsion mechanisms can be computed as expressed by the following Eqs. 21 to 23.

$$fR(\theta) = fR(0)\cdot \cos\theta + fR(\pi/2)\cdot \sin\theta \quad \text{Eq. 21}$$

$$fL(\theta) = fL(0)\cdot \cos\theta - |fL(\pi/2)|\cdot \sin\theta \quad \text{Eq. 22}$$

$$ft(\theta) = ft(\pi/2)\cdot \sin\theta \quad \text{Eq. 23}$$

fL(0) in Eq. 22 is (LR/LL)·fR(0), and fR(π/2) in Eq. 21 and −fL(π/2) in Eq. 22 are (Lt/(LR+LL))·ft(π/2).

Figure 8:
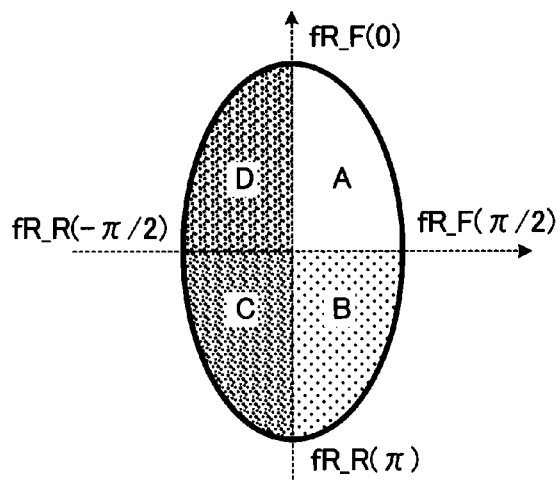
FIG. 8 is a view for explaining computation of a target rotational speed of the propeller.

By taking the thus-computed thrust forces as functions of rotational speeds of the propulsion systems, there can be obtained the target rotational speeds NpR and NpL of the right and left propellers 13, respectively, and the target rotational speed NtR or NtL of the propeller 14b which are required for translational movement. In this case, in consideration of a difference in thrust force generated and resistance between forward rotation and reverse rotation of each of the main engines 11, and the balance among fR(θ), fL(θ), and ft(θ), the target rotational speeds NpR, NpL, NtR, and NtL are computed with respect to four zones shown in FIG. 8. FIG. 8 schematically illustrates a propeller rotational-speed control circle with respect to the thrust force fR(θ); i.e., a rotational-speed control circle of the propeller 13 connected to the right-hand main engine 11 in FIG. 1. Herein, fR_F(0) is a rotational speed for moving the ship forward, and fR_R(π) is a rotational speed for moving the ship rearward, both in response to the ship operator's operation of the joystick 25. Also, fR_F(π/2) is a rotational speed for moving the ship rightward, and fR_R(−π/2) is a rotational speed for moving the ship leftward.

The target rotational speed NpR for the propeller 13 connected to the right-hand main engine 11 is computed according to the following Eq. 24 for translational movement in zone A; according to the following Eq. 25 for translational movement in zone B; according to the following Eq. 26 for translational movement in zone C; and according to the following Eq. 27 for translational movement in zone D.

$$NpR = fR\_F(0)\cdot \cos\theta + fR\_F(\pi/2)\cdot \sin\theta \quad 0\leq\theta\leq\pi/2 \quad \text{Eq. 24}$$

$$NpR = |fR\_R(\pi)|\cdot \cos\theta + fR\_F(\pi/2)\cdot \sin\theta \quad \pi/2\leq\theta\leq\pi \quad \text{Eq. 25}$$

$$NpR = |fR\_R(\pi)|\cdot \cos\theta + |fR\_R(-\pi/2)|\cdot \sin\theta \quad -\pi\leq\theta\leq-\pi/2 \quad \text{Eq. 26}$$

$$NpR = fR\_F(0)\cdot \cos\theta + |fR\_R(-\pi/2)|\cdot \sin\theta \quad -\pi/2\leq\theta<0 \quad \text{Eq. 27}$$

where fR_F(0), fR_R(π), fR_F(π/2), and fR_R(−π/2) are experimentally determined coefficients.

Similarly to the aforementioned Eqs. 24 to 27, the target rotational speed NpL for the propeller 13 connected to the left-hand main engine 11 is also computed according to the following Eq. 28 for translational movement in zone A; according to the following Eq. 29 for translational movement in zone B; according to the following Eq. 30 for translational movement in zone C; and according to the following Eq. 31 for translational movement in zone D.

$$NpL = fL\_F(0)\cdot \cos\theta - |fL\_R(\pi/2)|\cdot \sin\theta \quad 0\leq\theta<\pi/2 \quad \text{Eq. 28}$$

$$NpL = |fL\_R(\pi)|\cdot \cos\theta - |fL\_R(\pi/2)|\cdot \sin\theta\pi/2.0\leq\theta<\pi \quad \text{Eq. 29}$$

$$NpL = |fL\_R(\pi)|\cdot \cos\theta - fL\_F(-\pi/2)\cdot \sin\theta \quad -\pi\leq\theta<-\pi/2 \quad \text{Eq. 30}$$

$$NpL = fL\_F(0)\cdot \cos\theta - fL\_F(-\pi/2)\cdot \sin\theta \quad -\pi/2\leq\theta<0 \quad \text{Eq. 31}$$

where fL_F(0), fL_R(π), fL_F(−π/2), and fL_R(π/2) are experimentally determined coefficients.

Furthermore, the target rotational speed NtR or NtL for the propeller 14b of the thruster 14 is computed according to the following Eq. 32 for translational movement in zones A and B and according to the following Eq. 33 for translational movement in zones C and D.

$$NtR = ft\_R(\pi/2)\cdot \sin\theta \quad 0\leq\theta<\pi \quad \text{Eq. 32}$$

$$NtL = |ft\_L(-\pi/2)|\cdot \sin\theta \quad -\pi\leq\theta<0 \quad \text{Eq. 33}$$

where ft_R(π/2) is the rotational speed of the propeller 14b when the propeller 14b generates a rightward thrust force; ft_L(−π/2) is the rotational speed of the propeller 14b when the propeller 14b generates a leftward thrust force; and ft_R(π/2) and ft_L(−π/2) are experimentally determined coefficients.

Figure 9:
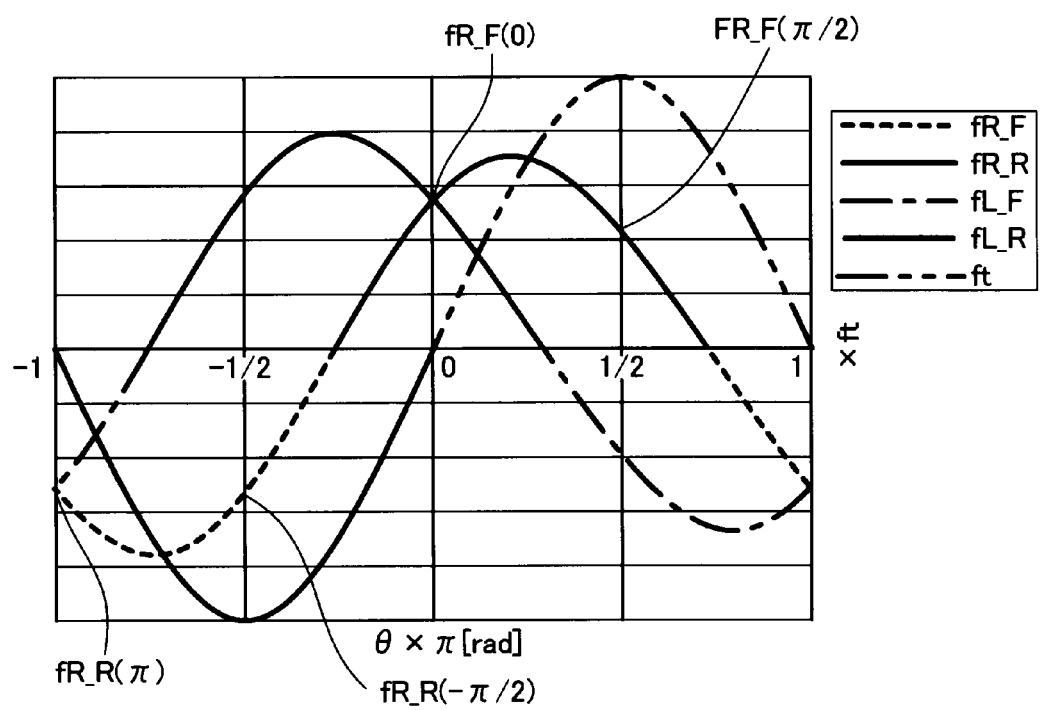
FIG. 9 is a graph showing the relation between an operational input value of the joystick and the rotational speed of the propeller at the time of translational movement.
Figure 10:
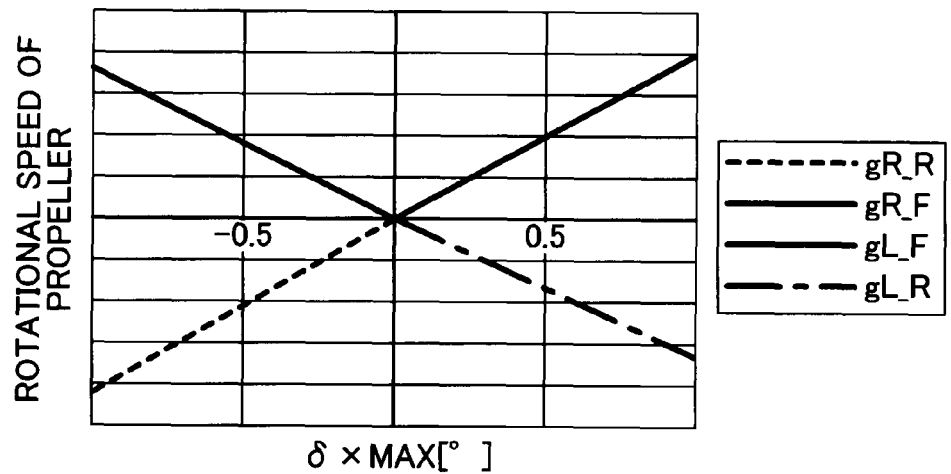
FIG. 10 is a graph showing the relation between an operational input value of the joystick and the rotational speed of the propeller at the time of pinwheeling.

Thus, when the ship operator tilts the joystick lever 25a of the joystick 25, the target propeller rotational-speed computation subsection 32 computes, for translational movement of the ship, the target rotational speeds NpR and NpL for the right and left propellers 13 according to Eqs. 24 to 33, and the target rotational speed NtR or NtL for the propeller 14b. In place of computation by the aforementioned Eqs. 24 to 33, computation may be carried out with reference to the conversion map shown in FIG. 9 which contains the target rotational speeds NpR, NpL, NtR, and NtL for the propellers 13 and 14b in relation to the direction θ of movement specified by the operation of tilting the joystick lever 25a of the joystick 25.

Next, pinwheeling will be described. As in the case of the above-described translational movement, in pinwheeling, n appearing in the aforementioned Eqs. 11 and 12 and indicative of the number of propulsion systems is also "3." The angle between thrust vectors of the main engines 11 and the front-rear direction of the hull 10 is "0," and the angle between a thrust vector of the thruster 14 and the front-rear direction of the hull 10 is "π/2." Also, in this case, in the aforementioned Eqs. 11 and 12, a propulsion mechanism corresponding to n=1 is taken as the right-hand main engine 11 in FIG. 1; a propulsion mechanism corresponding to n=2 is taken as the left-hand main engine 11 in FIG. 1; and a propulsion mechanism corresponding to n=3 is taken as the thruster 14. Then, the following Eqs. 34 and 35 hold.

$$gR(\delta) + gL(\delta) = 0 \quad \text{Eq. 34}$$

$$gt(\delta) = 0 \quad \text{Eq. 35}$$

In Eqs. 34 and 35, gR(δ) is a thrust force of the right-hand main engine 11; gL(δ) is a thrust force of the left-hand main engine 11; and gt(δ) is a thrust force of the thruster 14.

As is apparent from Eq. 35, when the ship is to undergo pinwheeling, the thrust force generated by the thruster 14 is "0"; in other words, in the case of pinwheeling, the thruster 14 is not operated. Therefore, the left- and right-hand main engines 11 are operated such that the aforementioned Eq. 34 holds; more specifically, such that thrusts are generated in the direction of forward movement and in the direction of rearward movement, respectively, for pinwheeling.

By taking the thus-computed thrust forces of the two main engines 11 as respective functions of rotational speeds, there can be obtained the target rotational speeds NpR and NpL of the propellers 13 which are required for pinwheeling. In this case, in consideration of a difference in thrust force generated and resistance between forward rotation and reverse rotation of each of the main engines 11, the target rotational speeds NpR and NpL are computed for each of forward-rotation drive and reverse-rotation drive of the main engines 11. Specifically, on the basis of the aforementioned Eqs. 34 and 35, the target rotational speeds NpR and NpL of the right and left propellers 13, respectively, can be computed as expressed by the following Eqs. 36 to 39.

$$NpR = (gR\_R(MAX)/MAX) \cdot \delta \quad 0 \leq \delta < MAX \qquad \text{Eq. 36}$$

$$NpR = (gR\_F(-MAX)/(-MAX)) \cdot \delta \quad -MAX \leq \delta < 0 \qquad \text{Eq. 37}$$

$$NpL = (gL\_F(MAX)/MAX) \cdot \delta \quad 0 \leq \delta < MAX \qquad \text{Eq. 38}$$

$$NpL = (gL\_R(-MAX)/(-MAX)) \cdot \delta \quad -MAX \leq \delta < 0 \qquad \text{Eq. 39}$$

In Eqs. 36 to 39, "MAX" is the maximum quantity of turning of the dial 25b of the joystick 25. In Eq. 36, gR_R(MAX) is the maximum thrust force of the right-hand main engine 11 in the direction of rearward movement; in Eq. 37, gR_F(-MAX) is the maximum thrust force of the right-hand main engine 11 in the direction of forward movement. Furthermore, In Eq. 38, gL_F(MAX) is the maximum thrust force of the left-hand main engine 11 in the direction of forward movement; in Eq. 39, gL_R(-MAX) is the maximum thrust force of the left-hand main engine 11 in the direction of rearward movement.

Thus, when the ship operator turns the dial 25b of the joystick 25, the target propeller rotational-speed computation subsection 32 computes, for pinwheeling of the ship, the target rotational speeds NpR and NpL for the right and left propellers 13 according to Eqs. 36 to 39. In place of computation by the aforementioned Eqs. 36 to 39, computation may be carried out with reference to the conversion map shown in FIG. 9 which contains the target rotational speeds NpR and NpL for the propellers 13 in relation to the angle δ of swinging specified by the operation of turning the dial 25b of the joystick 25.

As described above, the target rotational speeds NpR, NpL, NtR, and NtL of the propellers 13 and 14b which are computed by the target propeller rotational-speed computation subsection 32 are supplied to the main-engine operation control section 40 and to the thruster operation control section 50. The main-engine operation control section 40 controls operations of the main engines 11 and the clutch mechanisms 120 of the marine gears 12 such that the actual rotational speeds FpR and FpL of the propellers 13 become the received target rotational speeds NpR and NpL, respectively. That is, a target slip ratio determination subsection 41 of the main-engine operation control section 40 inputs thereto the current working rotational speeds FeR and FeL of the main engines 11 from the main-engine rotational-speed sensors 21 and determines a target slip ratio U for the clutch mechanisms 120 of the marine gears 12 according to the input working rotational speeds FeR and FeL. Determination of the target slip ratio U by the target slip ratio determination subsection 41 will next be described with reference to FIG. 11.

Figure 11:
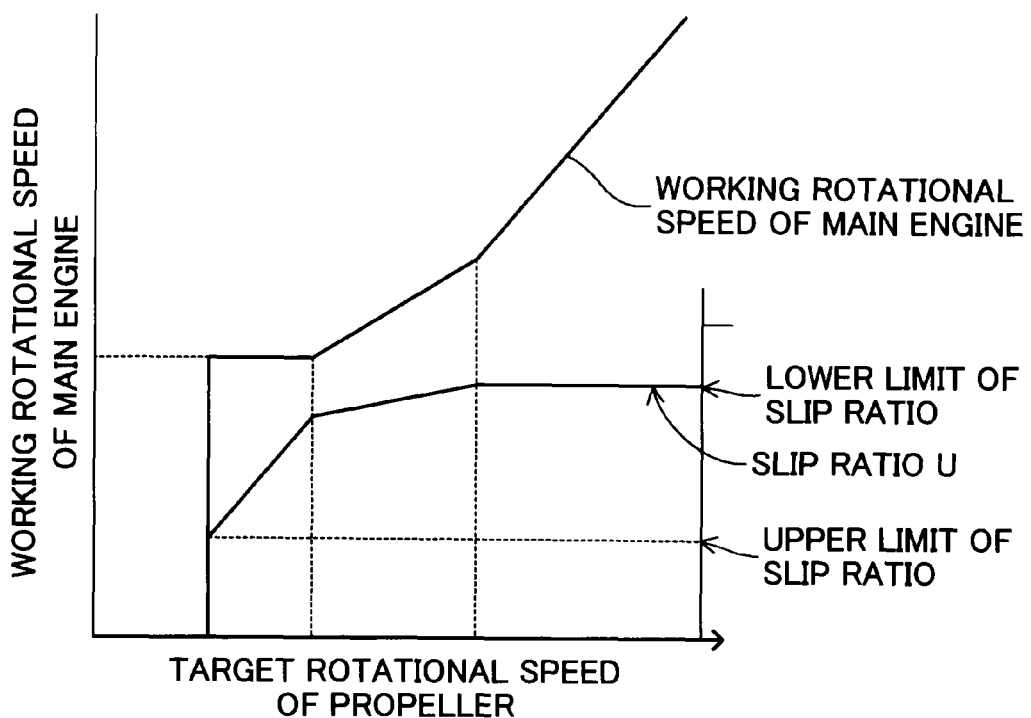
FIG. 11 is a graph showing the relation among the working rotational speed of a main engine, the target rotational speed of the propeller, and a target slip ratio.

As shown in FIG. 11, the target slip ratio U is determined on the basis of a relation that the target slip ratio U varies stepwise (in the present embodiment, in three steps) according to the working rotational speeds FeR and FeL of the main engines 11. Specifically, when the working rotational speeds FeR and FeL of the main engines 11 are an idle rotational speed, the target slip ratio U decrementally varies with a large inclination (hereinafter called the first inclination) according to an increase in the target rotational speeds NeR and NeL; when the working rotational speeds FeR and FeL of the main engines 11 increase from the idle rotational speed to less than a predetermined rotational speed, the target slip ratio U decrementally varies with an inclination (hereinafter called the second inclination) smaller than the first inclination; and when the working rotational speeds FeR and FeL of the main engines 11 increase to the predetermined rotational speed or greater, the target slip ratio U varies so as to assume a constant value; i.e., a lower limit of the target slip ratio U.

By means of varying the target slip ratio U stepwise with the first and second inclinations as mentioned above, the actual rotational speeds FpR and FpL of the propellers 13 can be varied linearly. Specifically, when the main engines 11 operate at the working rotational speeds FeR and FeL equal to the idle rotational speed; in other words, when the main engines 11 operate under no load, varying the target slip ratio U with the first inclination for determination of the target slip ratio U is accompanied by linear variation of the actual slip ratio of the clutch mechanisms 120. Therefore, when the main engines 11 operate at less than the idle rotational speed, the propellers 13 can be rotated while their actual rotational speeds FpR and FpL are linearly varied.

By setting the first inclination to a large value, the target slip ratio U can be greatly varied. This allows the actual slip ratio of the clutch mechanisms 120 to be greatly reduced; in other words, this can establish a state of facilitating transmission of rotational drive forces of the main engines 11 to the respective propellers 13. Therefore, the propellers 13 can be reliably rotated.

When the working rotational speeds FeR and FeL of the main engines 11 vary from the idle rotational speed to the predetermined rotational speed, the target slip ratio U can be determined by linearly varying the target slip ratio U with the second inclination. In this case, the actual slip ratio of the clutch mechanisms 120 varies linearly according to variation of the working rotational speeds FeR and FeL of the main engines 11. Therefore, the propellers 13 can be rotated while their actual rotational speeds FpR and FpL are linearly varied. Furthermore, when the main engines 11 operate at the working rotational speeds FeR and FeL equal to or greater than the predetermined rotational speed, the target slip ratio U can be made constant. In this case, since the actual slip ratio of the clutch mechanisms 120 is constant, the actual rotational speeds FpR and FpL of the propellers 13 vary linearly according to variation of the working rotational speeds FeR and FeL of the main engines 11. By means of varying the target slip ratio U in this manner, the actual rotational speeds FpR and FpL of the propellers 13 can be linearly varied. Therefore, as mentioned above, the speed of movement at the time of translational movement can be linearly varied, so that the ship operator can move the ship with ease.

When the working rotational speeds FeR and FeL of the main engines 11 vary in a range of from the idle rotational speed to less than the predetermined rotational speed, by varying the target slip ratio U with the second inclination, impact associated with engagement between the friction plates 122 and the separator plates 124 of the clutch mechanisms 120 can be reduced. This will be described below.

Assuming, for example, that the second inclination is not employed and that, when the main engines 11 operate at the idle rotational speed (i.e., when the main engines 11 operate under no load), the ship operator has abruptly operated the joystick 25, the propellers 13 connected to the respective main engines 11 start rotating so as to respond the operation. At this time, since the ship operator has abruptly operated the joystick 25, the target slip ratio determination subsection 41 abruptly lowers the target slip ratio U to its lower limit at which the target slip ratio U becomes constant, so as to bring the rotational speeds of the propellers 13 to the respective target rotational speeds NpR and NpL. Meanwhile, when the propellers 13 abruptly start to rotate, associated resistance increases, so that the working rotational speeds FeR and FeL of the main engines 11 drop transiently. In this state, since the actual slip ratio becomes lower than the target slip ratio U (the clutch mechanisms 120 'overshoot' to a direct connection state), the actual rotational speeds FpR and FpL of the propellers 13 become higher than the target rotational speeds NeR and NeL, respectively; in other words, the propellers 13 rotate excessively. In this state, the ship moves abruptly, potentially bringing discomfort to passengers on board the ship.

By contrast, setting the second inclination can reduce variation of the actual slip ratio in relation to variation of the working rotational speeds FeR and FeL of the main engines 11. That is, in contrast to a mode of variation of the target slip ratio U in which the target slip ratio U directly varies to a constant value from the first inclination, setting the second inclination establishes a mode of variation of the target slip ratio U in which the target slip ratio U varies gently to the constant value from the first inclination. Therefore, even when the working rotational speeds FeR and FeL of the main engines 11 drop transiently due to the ship operator's abrupt operation of the joystick 25, setting the second inclination allows determination of the target slip ratio U through varying of the target slip ratio U with the second inclination. This can restrain abrupt variation of the actual slip ratio and can restrain the tendency of the above-mentioned overshoot. This can prevent passengers on board the ship from feeling discomfort.

Again returning to the description of FIG. 5, when the target slip ratio determination subsection 41 determines the target slip ratio U, the target slip ratio determination subsection 41 supplies the determined target slip ratio U to a drive control subsection 42. The drive control subsection 42 controls the drive circuits 27 according to the target rotational speeds NpR and NpL of the propellers 13, thereby controlling the corresponding openings of the throttle bodies of the main engines 11; i.e., controlling the operations of the corresponding actuators. Accordingly, the working rotational speeds FeR and FeL of the main engines 11 are regulated. Also, the drive control subsection 42 controls the drive circuits 28 such that preset drive currents corresponding to the determined target slip ratio U flow to the corresponding pressure-regulating valves 128 provided on the clutch mechanisms 120. At this time, on the basis of currents IR and IL input from the corresponding pressure-regulating-valve current sensors 27, the drive control subsection 42 feedback-controls the drive circuits 28.

Furthermore, the drive control subsection 42 receives the working rotational speeds FeR and FeL of the main engines 11 from the corresponding main-engine rotational-speed sensors 21 and the actual rotational speeds FpR and FpL of the propellers 13 from the corresponding propeller rotational-speed sensors 22. The drive control subsection 42 controls the drive circuits 28 such that the actual rotational speeds FpR and FpL of the propellers 13 become the target rotational speeds NpR and NpL, respectively. However, due to the influence of disturbances, such as sea currents and wind, or dirt adhering to the propellers 13, the propellers 13 may fail to rotate at the respective target rotational speeds NpR and NpL.

In order to cope with the above problem, on the basis of the difference between the working rotational speeds FeR and FeL input from the main-engine rotational-speed sensors 21 and the corresponding current actual rotational speeds FpR and FpL of the propellers 13 input from the propeller rotational-speed sensors 25, the drive control subsection 42 appropriately corrects the drive currents and feedback-controls the drive circuits 28 such that the corrected drive currents flow. This can optimize the actual slip ratio of the clutch mechanisms 120, so that the propellers 13 can be rotated at the respective target rotational speeds NpR and NpL.

Meanwhile, the thruster operation control section 50 controls operation of the electric motor 14a such that the actual rotational speed FtR or FtL of the propeller 14b becomes the supplied target rotational speed NtR or NtL. The operation determination subsection 51 of the thruster operation control section 50 determines the rotational direction of the propeller 14b according to the supplied target rotational speed NtR or NtL. Upon determination of the rotational direction of the propeller 14b, a drive control subsection 52 controls driving of the electric motor 14a. Specifically, the drive control subsection 52 receives, from the drive circuit 29, the value of a drive current flowing through the electric motor 14a and feedback-controls the drive circuit 29 such that a drive current corresponding to the target rotational speed NtR or NtL flows through the electric motor 14a. Through this control of driving of the electric motor 14b, the electric motor 14a rotates the propeller 14b at the target rotational speed NtR or NtL, so that the propeller 14b generates an associated thrust force.

Also, the drive control subsection 52 receives the actual rotational speed FtR or FtL of the propeller 14b from the thruster rotational-speed sensor 24 and controls driving of the electric motor 14a such that the actual rotational speed FtR or FtL of the propeller 14b becomes the target rotational speed NtR or NtL. As mentioned above, the drive control subsection 52 applies a preset drive current corresponding to the target rotational speed NtR or NtL to the electric motor 14a via the drive circuit 29, thereby driving the electric motor 14a. However, due to, for example, dirt adhering to the hull 10 and to the propeller 14b, the actual rotational speed FtR or FtL of the propeller 14b may fail to be maintained at the target rotational speed NtR or NtL. In order to cope with the problem, by use of the actual rotational speed FtR or FtL of the propeller 14b input from the thruster rotational-speed sensor 24, the drive control subsection 52 appropriately corrects drive current and feedback-controls the drive circuit 29 such that the corrected drive current flows. By virtue of this, the propeller 14b can be rotated reliably at the target rotational speed NtR or NtL, so that the thruster 14 can generate an appropriate thrust force.

Figure 12:
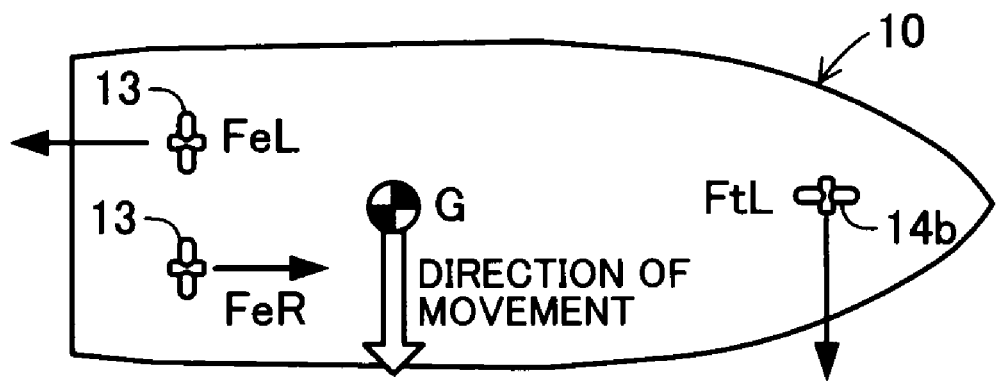
FIG. 12 is a view for explaining the operations of the main engines and the operation of a thruster at the time of translational movement.

When the propellers 13 connected to the two main engines 11 and the propeller 14b of the thruster 14 are controlled in rotational speed as mentioned above, the ship carries out an operation of translational movement, an operation of pinwheeling, or a combination of these operations according to the ship operator's operation of the joystick 25. Specifically, when the ship operator, for example, tilts the joystick lever 25a of the joystick 25 rightward to thereby input a value associated with $\theta = \pi/2$, the ship moves translationally rightward. At this time, the propulsion systems operate as shown in FIG. 12. The arrow in FIG. 12 shows the direction in which the ship travels by thrust forces generated by the propulsion systems.

Figure 13:
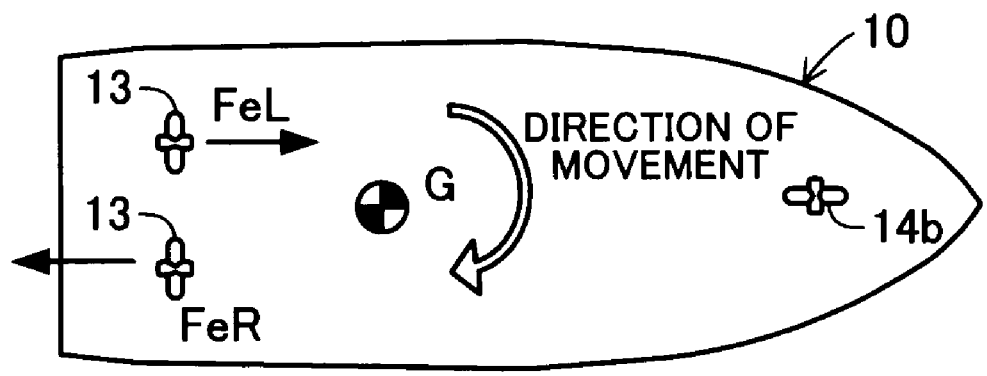
FIG. 13 is a view for explaining the operations of the main engines at the time of pinwheeling.

When the ship operator, for example, turns the dial 25b of the joystick 25 clockwise to thereby input a value associated with δ=MAX, the ship undergoes clockwise pinwheeling. At this time, the propulsion systems operate as shown in FIG. 13. The arrow in FIG. 13 shows the direction in which the ship swings by thrust forces of the propulsion systems. In the case of pinwheeling, the thruster 14 does not operate, and the main engines 11 generate thrust forces in mutually opposite directions, whereby the ship swings in situ.

Figure 14:
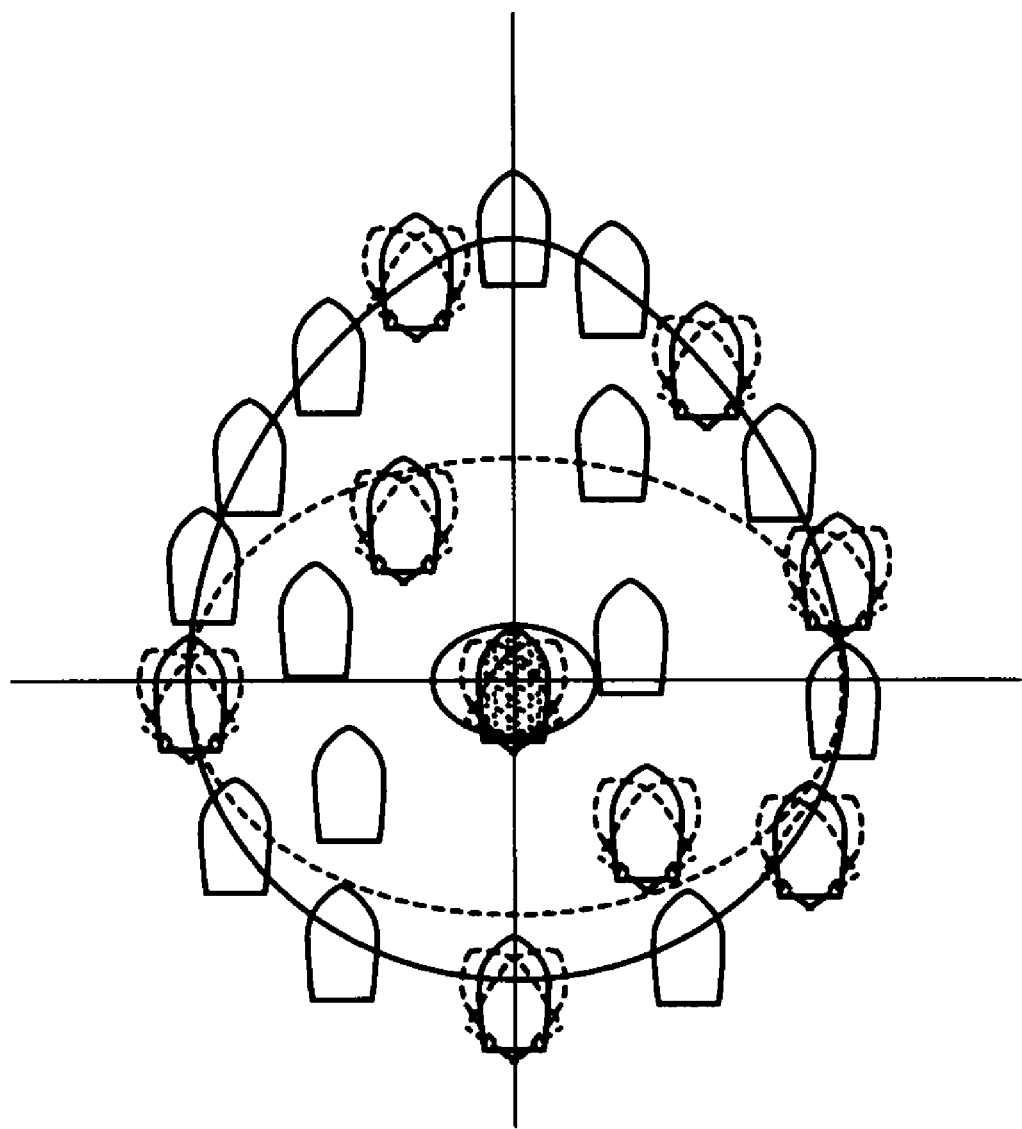
FIG. 14 is a view for explaining the movements of the hull at the time of combinations of translational movement and pinwheeling.

Furthermore, when the ship operator tilts the joystick lever 25a of the joystick 25 and also turns the dial 25b of the joystick 25, the ship swings while translationally moving. These operations of the ship are schematically shown in FIG. 14. The ship operator can move the ship in every direction by operating the joystick 25.

As is understandable from the above description, the ship-steering device according to the present embodiment allows the ship operator to cause the ship to undergo translational movement and pinwheeling while running at dead slow speed, merely by operating the joystick 25. Therefore, even though the ship operator is unfamiliar with the behavioral variations of the ship, he/she can steer the ship very easily with simple operations.

The target rotational speeds NpR and NpL of the propellers 13 and the target rotational speed NtR or NtL of the propeller 14b of the thruster 14 can be computed so as to achieve modes of movement of the ship as steered with the joystick 25 by the ship operator. The clutch mechanisms 120 of the marine gears 12 and the electric motor 14a can be operated such that the propellers 13 rotate at the target rotational speeds NpR and NpL. Therefore, a mode of movement of the ship which is intended by the ship operator can be favorably reproduced; as a result, the ship operator can steer the ship with simple operations.

By means of determining the target slip ratio U of the clutch mechanisms 120 of the marine gears 12 through varying of the target slip ratio U within a predetermined range, the actual rotational speeds FpR and FpL of the propellers 13 connected to the corresponding main engines 11 can be linearly varied. Therefore, the propellers 13 can be rotated in such a manner that their rotational speeds are linearly varied to the target rotational speeds NpR and NpL, so that the ship can be moved very easily and accurately.

At this time, the target slip ratio U of the clutch mechanisms 120 can be varied stepwise according to the working rotational speeds FeR and FeL of the main engines 11. Specifically, when the working rotational speeds FeR and FeL of the main engines 11 are the idle rotational speed, the target slip ratio U is varied with the first inclination; when the working rotational speeds FeR and FeL are greater than the idle rotational speed and less than the predetermined rotational speed, the target slip ratio U is varied with the second inclination; and when the working rotational speeds FeR and FeL are equal to or greater than the predetermined rotational speed, the target slip ratio U is made constant. This allows determination of the optimum target slip ratio U according to the working rotational speeds FeR and FeL of the main engines 11.

Particularly, even when the main engines 11 operate at the idle rotational speed, by means of varying the target slip ratio U on the basis of the first inclination, the propellers 13 can be operated reliably at the target rotational speeds NpR and NpL. By means of determining, in consideration of durability of the clutch mechanisms 120, a constant value which the target slip ratio U assumes, the clutch mechanisms 120 can exhibit good durability.

Furthermore, setting the second inclination can effectively prevent generation of impact associated with operation of the clutch mechanisms 120. By virtue of this, no discomfort is brought to passengers on board the ship. Also, the joystick 25 can be composed of the joystick lever 25a and the dial 25b in such a manner that the joystick lever 25a and the dial 25b are united together, the ship operator tilting the joystick lever 25a and turning the dial 25b. By virtue of this, for example, when the ship is to come alongside or leave a pier, the ship operator can steer the ship one-handed and thus can enjoy very good operability.

The present invention is not limited to the above-described embodiment and may be embodied in various other forms without departing from the object of the present invention.

For example, in the above embodiment, the propulsion system is constituted by three propulsion mechanisms; i.e., two main engines 11, and the thruster 14 provided at the bow. However, the propulsion system may be constituted by four or more propulsion mechanisms; for example, an additional thruster may be provided on the bow side of the hull 10. In this case, by employing n=4 in the aforementioned Eqs. 5 to 8 and Eqs. 11 and 12, target rotational speeds of the propellers can be computed in a manner similar to the aforementioned Eqs. 24 to 33 and Eqs. 34 and 35. Therefore, effects similar to those of the above embodiment can be expected.

The above embodiment is described while mentioning the ship which has the propellers 13 and the propeller 14b disposed underwater for generating thrust forces. However, since the aforementioned Eqs. 5 to 8 and Eqs. 11 and 12 hold with respect to fluid (e.g., air), the ship-steering device of the present invention can be applied to, for example, Hovercraft. In this case, if the direction of air discharge is set similarly to the above embodiment, effects similar to those of the above embodiment can be expected.

The invention claimed is:

1. A ship-steering device which controls an operation of a clutch mechanism of a marine gear adapted to transmit rotation of a main engine to a propeller, so as to vary a rotational speed of the propeller in relation to a rotational speed of the main engine, comprising:
   ship-steering means which a ship operator operates for steering a ship;
   operational-input-value detection means for detecting an operational input value which the ship operator inputs to the ship-steering means;
   target propeller rotational-speed computation means for computing a target rotational speed of the propeller in relation to the rotational speed of the main engine on the basis of the detected operational input value;
   target slip-ratio determination means for determining a target slip ratio of the clutch mechanism of the marine gear within a predetermined range in order to rotate the propeller at the computed target rotational speed; and
   operation control means for controlling a quantity of operation of the clutch mechanism of the marine gear with the determined target slip ratio, wherein
   the target slip-ratio determination means determines the target slip ratio on the basis of a relation that, when the rotational speed of the main engine is less than an idle rotational speed, which is a rotational speed of the main engine under no load, the target slip ratio varies uniformly with a first inclination;
   when the rotational speed of the main engine is equal to or greater than the idle rotational speed and less than a predetermined rotational speed, the target slip ratio varies uniformly with a second inclination smaller than the first inclination; and when the rotational speed of the main engine is equal to or greater than the predetermined rotational speed, the target slip ratio becomes constant.

2. A ship-steering device according to claim 1, further comprising actual-rotational-speed detection means for detecting an actual rotational speed of the propeller, wherein the operation control means corrects the quantity of operation of the clutch mechanism on the basis of a difference between the detected actual rotational speed and the target rotational speed while taking into consideration variation of the actual rotational speed of the propeller caused by disturbance acting on the ship.

3. A ship-steering device according to claim 1, wherein the ship-steering means comprises:

a joystick lever which inputs a direction of movement and a speed of movement of the ship when tilted by the ship operator, and a dial which is unitarily attached to the joystick lever and which inputs a direction of swinging and a speed of swinging of the ship when turned.

4. A ship-steering device according to claim 3, wherein the ship-steering means is operated by the ship operator when the ship is to come alongside or leave a pier.

5. A ship-steering device according to claim 3, wherein the tilting operation of the joystick lever by the ship operator is an operation of translationally moving the ship within four zones around the ship in accordance with the tilting operation; and the target propeller rotational-speed computation means calculates a target rotational speed of the propeller for translationally moving the ship within the four zones on the basis of the direction of the tilting operation of the joystick lever.

6. A ship-steering device according to claim 3, wherein the turning operation of the dial by the ship operator is an operation of swinging the ship in accordance with the turning operation, while maintaining the position of the ship; and the target propeller rotational-speed computation means calculates, on the basis of the direction of the turning operation of the dial, a target rotational speed of the propeller for swinging the ship in a direction coinciding with the direction of the turning operation, while maintaining the position of the ship.

7. A ship-steering device according to claim 1, further comprising thruster control means for controlling operation of a thruster adapted to swing, in a predetermined turning direction, the ship in a dead slow run state in which the rotational speed of the propeller is reduced in relation to the rotational speed of the main engine, wherein the thruster control means controls the operation of the thruster by continuously changing the rotational speed of the thruster from a low speed range.

* * * * *